United States Patent [19]  
Andrianov

[11] 3,769,700  
[45] Nov. 6, 1973

[54] METHOD FOR MANUFACTURING CORES OF ELECTRICAL DEVICES
[76] Inventor: Vasily Sergeevich Andrianov, Borisovskaya ulitsa, 21, kv. 11, Moscow, U.S.S.R.
[22] Filed: Oct. 19, 1971
[21] Appl. No.: 190,607

[52] U.S. Cl. .................... 29/607, 29/609, 336/233
[51] Int. Cl. ............................................. H01f 7/06
[58] Field of Search ............... 29/607, 609, 602; 336/233, 234

[56] References Cited
UNITED STATES PATENTS
| 1,543,001 | 6/1925 | Gaynor | 29/609 X |
| 1,883,905 | 10/1932 | Hartzell | 336/92 |
| 3,606,674 | 9/1971 | Givan | 29/609 X |
| 3,398,450 | 8/1968 | Subovici | 29/609 UX |
| 3,495,327 | 2/1970 | Eisler | 29/609 |
| 2,682,021 | 6/1954 | Elmen | 29/607 |
| 2,552,109 | 5/1951 | Nahman | 336/234 |
| 1,365,569 | 1/1921 | Troy | 336/234 |

Primary Examiner—Charles W. Lanham  
Assistant Examiner—Carl E. Hall  
Attorney—Eric H. Waters et al.

[57] ABSTRACT

The method consists in deforming a sheet blank, in which slots have been made, along its transversal axis. Deforming forces are applied along the plane of the blank, perpendicular to the slots. These forces arbitrarily bend the blank and press it.

5 Claims, 5 Drawing Figures

METHOD FOR MANUFACTURING CORES OF ELECTRICAL DEVICES

The present invention relates to a method of manufacturing cores of electrical devices, in particular the cores of transformers, choke coils, electromagnets, relays, induction coils of ignition systems, etc.

At present there is known a method for manufacturing the cores of induction coils of ignition systems, choke coils and other similar devices, wherein plates of the required shape and size are cut out from magnetic sheet material. Then these plates are made up into packages and fastened together, for example, with screws or rivets. Cores manufactured in this way are well adapted to filling the cross section with the magnetic material, but are labor-consuming in manufacture.

In addition, when cutting out plates having a complicated configuration, for example, U-shaped ones, it is not possible to obtain plates with a directional granularity and, consequently, over the entire contour of the core. It is good practice to retain the granularity over the entire contour of the core since this improves its electromagnetic properties.

There is also known a method for manufacturing ribbon cores from sheet blanks. Such cores have a directed granularity over the entire contour of the core and are simpler to manufacture than assembled cores, but have a lower capability of filling cross sections, since in the process of winding the core, owing to the elastic nature of the material, it is not possible to achieve close fitting of one turn to the next one. In addition, this method can be used to manufacture only cores of a cylindrical shape.

There is also known a method for manufacturing cores of electrical devices by deforming sheet blanks in which longitudinal slots are preliminarily made along their longitudinal axis.

The slots are made with a definite spacing or pitch depending on the shape of the core to be produced. After the slots have been made, the sheet blank is deformed, the forces being so applied that the plate bends in the form of an accordeon. The sides of adjacent sections formed by the slots come into contact, remaining flat, i.e., during bending they do not deform.

In manufacturing a core, first a wavy shape is imparted to the sheet blank, bending it at the slotted places, the amplitude of the bending waves depending on the shape of the cross section of the core being manufactured.

Thus, for example, in manufacturing a core of a cylindrical shape the amplitudes of the waves increase from the edges of the blank toward its center. Owing to this operation it is possible to produce a core of the required shape.

In addition, it is impossible, in this method of core manufacturing, to make cores having a complicated configuration, such as U-shaped and E-shaped ones.

An object of the present invention is to provide a method for manufacturing cores that will ensure cores of both simple and complicated shapes with a good coefficient of filling the cross section of the core.

Another object of the present invention is to provide a method for manufacturing cores that will ensure retaining of the oriented granularity along the entire contour of the core.

In accordance with these and other objects there is proposed a method for manufacturing cores of electrical devices by deforming sheet blanks in which slots are preliminarily made perpendicular to the longitudinal axes of the blanks, wherein, according to the invention, deforming forces are applied along the planes of the blanks and perpendicular to the slots, as a result of which the blank is bent arbitrarily both at the places of the slots and between them, and is the pressed to form a core. In the completed cores, the slots will occupy a substantially axial direction.

If shaped cores are to be manufactured, it is expedient to bend the sheet blanks, before their deformation, perpendicular to the slots according to the shape of the core to be produced. It is preferable to form the blanks in a heated state when materials are used that are difficult to deform.

The proposed method makes it possible to manufacture cores having a complicated configuration, for example, U-shaped and E-shaped cores, with an oriented granularity along the entire contour of the core. In addition, as shown by tests of motor vehicle ignition coils manufactured according to the proposed method, the electrical characteristics of the coils were practically the same as those of coils manufactured by known methods.

Thus, the proposed method made it possible to mechanize the process of core assembly, and allows cores with good electromagnetic properties to be made, regardless of the shape of the core to be produced at the minimum cost.

The nature of the present invention will become more fully apparent from a consideration of the following description of an exemplary embodiment thereof, taken in conjunction with the accompanying drawings, in which.

The method of manufacturing cores of electrical devices, for example, cores of induction coils, choke coils, transformers, relays and the like consists in that slots 2 (FIG.1) are made in sheet blanks 1, cut out from a magnetic material, along the transversal axes 0—0 of the blanks, and then the blanks are deformed. Deformation is performed in presses, i.e., one or several blanks are placed into a die 3 (FIG. 2) of a press and are then pressed by a punch 4. When comparing the blank of FIG. 1 with the completed core of FIG. 2 made therefrom, it will be seen that the slots, initially perpendicular to the longitudinal axis of the blank, run axially (or longitudinally) in the core.

Figure 2:
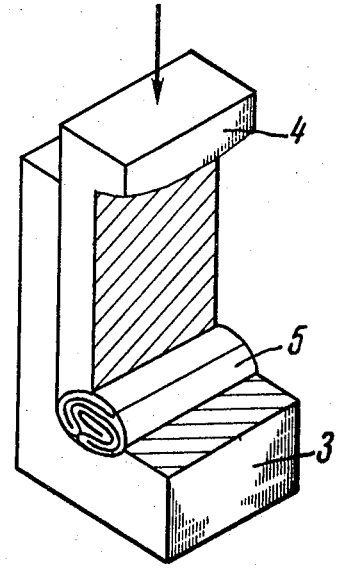
FIG. 2 is a view of a cylindrical core after deformation of a sheet blank in a press, with a partial section of a press tool.
Figure 5:
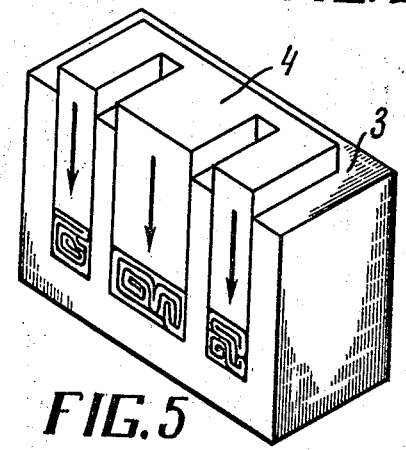
FIG. 5 is a view of the position of the blanks in the die when manufacturing an E-shaped core.

Blank 1 is so arranged in die 3 that the deforming forces will be directed along the planes of the blanks and perpendicular to slots 2; the direction of these forces is shown by arrows in FIGS. 2 and 5.

During the process of deformation, blank 1 is bent arbitrarily both at the places of slots 2 and between them, in the areas marked by numeral 6. After this the blank is finally pressed, forming a completed core 5.

When manufacturing cores in the form of a straight bar, one or several straight sheet blanks 1 are so placed into die 3 that the direction of the deforming force will be perpendicular to the slots, and then pressure is applied by punch 4.

Figure 1:
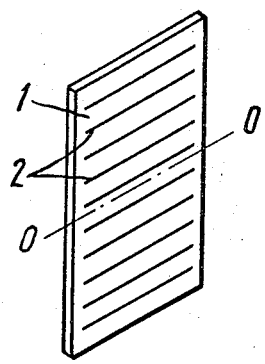
FIG. 1 is a view of a sheet blank made according to the method of the present invention.

To obtain such cores with good electromagnetic properties it is essential that the slots be made parallel to the direction of granularity on the surface of the blank, i.e., the direction of the granularity should coincide with the transversal axis 0—0 (FIG. 1).

Figure 3:
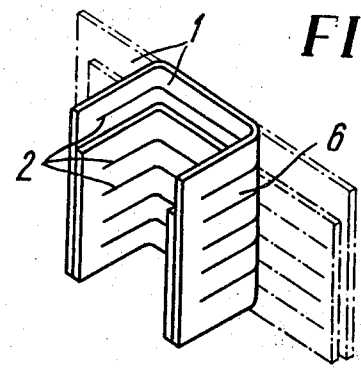
FIG. 3 is a view of bent sheet blanks for manufacturing U-shaped cores.
Figure 4:
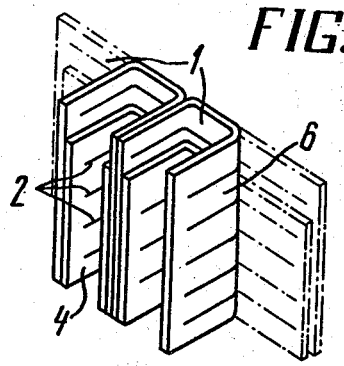
FIG. 4 is the same for manufacturing E-shaped cores.

When manufacturing shaped cores, for example, U-shaped (FIG. 3) or E-shaped (FIG. 4) ones, one or several sheet blanks 1 are bent before deformation perpendicular to slots 2 and the direction of granularity in accordance with the shape of the cores to be produced.

Cores bent in this way are placed into the die of the press tool, where the blanks are deformed by means of punch 4, forming a core of the required shape.

Blanks of cores made from a material difficult to deform are pressed in the heated state when required.

What is claimed is:

1. A method for manufacturing cores of electrical devices, comprising the steps of making slots in sheet balnks along the transversal axes of the blanks; confining the slotted blanks inside a die, and subsequently deforming them by applying forces with a punch along the planes of the slotted blanks and perpendicular to the slots; thereby arbitrarily bending the blanks both at the places of the slots and between the latter; and also pressing the slotted, deformed and bent blanks, so as to approximate the contours of the cores, wherein the transversal slots of the blanks are substantially in axial directions of the completed cores.

2. The method as defined in claim 1, further comprising the step of initially angularly bending at least two of the slotted blanks, in a direction perpendicular to the slots, before the deforming step, to produce special shapes of the cores, and wherein the arbitrary bending step is performed mainly on protruding limb portions of the slotted, deformed blanks.

3. The method as defined in claim 1, further comprising the step of heating the slotted blanks before the deforming step.

4. The method as defined in claim 1, further comprising the step of performing a final pressing operation on the slotted, deformed and arbitrarily bent blanks, to bring them from the approximated contours of the cores to the final shapes of the latter.

5. The method as defined in claim 1, wherein the step of cutting slots in the blanks is performed so that the slots are parallel to the direction of granularity on the surface of the blanks.

* * * * *